United States Patent [19]
Hinze

[11] Patent Number: 5,118,332
[45] Date of Patent: Jun. 2, 1992

[54] COMPOSITE BRAZED SPINNER

[75] Inventor: Jay W. Hinze, Newark, Ohio

[73] Assignee: Owens-Corning Fiberglas Corporation, Toledo, Ohio

[21] Appl. No.: 709,850

[22] Filed: Jun. 4, 1991

[51] Int. Cl.$^5$ .............................................. C03B 37/04
[52] U.S. Cl. ................................................ 65/6; 65/1; 65/8; 65/14; 65/15; 65/374.12; 264/8
[58] Field of Search ........................ 65/1, 6, 8, 14, 15, 65/374.12; 264/8; 425/8

[56] References Cited

U.S. PATENT DOCUMENTS

| | | | |
|---|---|---|---|
| 2,529,962 | 11/1950 | Powell . | |
| 3,031,717 | 5/1962 | Leveegue et al. | 65/15 |
| 3,190,736 | 6/1965 | Benner | 65/15 |
| 3,235,349 | 2/1966 | Gould | 65/15 X |
| 3,245,768 | 4/1966 | Simmers | 65/15 |
| 3,331,668 | 7/1967 | Ekdahl | 65/1 |
| 3,511,306 | 5/1970 | Warkoczewski | 65/15 |
| 3,591,362 | 7/1971 | Benjamin | 75/5 BA |
| 3,738,817 | 6/1973 | Benjamin | 29/182.5 |
| 3,814,635 | 6/1974 | Cometio et al. | 148/11.5 R |
| 3,933,484 | 1/1976 | Costin | 75/171 |
| 3,980,473 | 9/1976 | Costin | 75/171 |
| 3,984,240 | 10/1976 | Costin | 75/171 |
| 4,402,767 | 9/1983 | Hinze et al. | 148/11.5 P |
| 4,511,383 | 4/1985 | Bhatti | 65/6 |
| 4,668,265 | 5/1987 | Gaul et al. | 65/8 |
| 4,668,266 | 5/1987 | Gaul | 65/8 |
| 4,761,169 | 8/1988 | Gaul | 65/8 |
| 4,765,817 | 8/1988 | Gaul | 65/8 |
| 4,767,432 | 8/1988 | Gaul | 65/8 |
| 4,820,324 | 4/1989 | Gaul et al. | 65/8 |
| 4,877,435 | 10/1989 | Haeberle, Jr. et al. | 65/1 |
| 4,948,409 | 8/1990 | Chenoweth et al. | 65/15 |

OTHER PUBLICATIONS

Metals Handbook, 8th Edition, vol. 5, Copyright 1970 American Society for Metals entitled Ring Rolling pp. 105–112.

Frontiers of High Temperature Materials II, Conferernce on Oxide Dispersion Strengthened Superalloys by Mechanical Alloying, London, May 22–25, 1983.

Forging & Fabrication of ODS Alloys by E. Grundy, Patton, Precious & Pinder pp. 100–115.

Other Applications of Superalloys by Grundy, Material Science & Technology, Sep. 1987, vol. 3, p. 782.

Sulzer Plasma Technik, Inc. entitled "Precision Dry-Atomized Brazing Filler Metals". Nicrobraz of Walll Colmonoy Corp.

Braze Repair of Aero Engine Components, by K. B. Gove, p. 342, Metals & Materials Jun. 1989.

Optimizing Processing Variables in High-Temperature Brazing with Nickel-Based Filler Metals by Sakamoto, Fujiwara, Hattori & Sakai, Welding Journal, p. 63 Mar., 1989.

New Applications for Rapidly Solidified Brazing Foils appearing in Welding Journal, p. 139 by A. Rabinkin.

Primary Examiner—Robert L. Lindsay
Attorney, Agent, or Firm—Patrick P. Pacella; Ted C. Gillespie; Robert F. Rywalski

[57] ABSTRACT

Composite spinners for use in forming glass fibers are formed by transient liquid phase bonding of an oxide dispersion strengthened foraminous sidewall portion to a non-oxide dispersion strengthened bottom wall portion.

7 Claims, 1 Drawing Sheet

COMPOSITE BRAZED SPINNER

TECHNICAL BACKGROUND

This invention relates to the manufacture of glass fibers; it also relates to the manufacture of glass fiber forming spinners. More specifically the present invention relates to the manufacture and use of glass fiber forming spinners which are formed of two different alloys.

BACKGROUND ART

In certain industrial applications there is a need for the use of alloys which possess high rupture strength and high oxidation resistance at high temperatures. Notable among such applications are those in the glass fiber industry where glass fiber filaments are produced from molten materials by passage through the foraminous walls of a ring shaped member which is adapted for rotation at high speeds. Such a device is generally referred to as a spinner. The filaments are attenuated and emitted through the glass fiber forming apertures of the wall of the rotating spinner due to the high centrifugal action. Since spinners are operated at elevated temperatures and under high stress because of high rotational speeds, there is a need for these spinners to be formed of materials which have high strength and low creep at elevated temperatures.

One type spinner which is typically employed in the fiberglass industry includes an apertured sidewall having an upper inwardly extending flange and a lower inwardly extending bottom wall which extends inwardly of the upper flange and terminates in a small centrally disposed opening. The portion of the spinner which is most critical and has the greatest need for high strength and glass corrosion resistance at elevated temperatures is the wall portion. The bottom flange need not, to the same degree, possess all the important characteristics that are needed in the wall.

Oxide dispersion strengthened metals have been proposed for forming spinners. In this regard reference may be had to, for example, U.S. Pat. Nos. 4,402,767 and 4,877,435. Unfortunately, while these materials have many highly beneficial characteristics they are expensive to employ. Employing them as the bottom wall of a spinner is to employ an expensive material with many highly desirable properties when, in fact, a less costly material would be satisfactory.

Consequently, it would be desirable to form a composite spinner of the type described above in which the sidewall and top flange are formed from an oxide dispersion strengthened metal but in which the bottom wall is formed from a non-oxide dispersion strengthened metal which is less costly than the oxide dispersion strengthened material. Welding the bottom wall portion to the sidewall portion is a way of connecting the two. Unfortunately, however, welding a non-oxide dispersion strengthened metal to an oxide dispersion strengthened metal is unreliable in that cracking results. Additionally such welding can destroy the important grain morphology and dispersoid distribution of the oxide dispersion strengthened metal.

The present invention provides for the formation, and use, of a composite spinner formed from an oxide dispersion strengthened metal and a non-oxide dispersion strengthened metal wherein the materials are tenaciously joined, or connected, and, yet, are not plagued by the unreliability and morphological deficits associated with welding.

DISCLOSURE OF THE INVENTION

In accordance with one aspect of this invention an improvement is provided in fiberglass forming spinners of the type which include a first annular portion having a foraminous fiber forming wall and an integral second annular inwardly extending portion. The improvement resides in transient liquid phase bonding the first and second portions to each other.

In accordance with another aspect of this invention, an improvement in glass fiber forming techniques is provided wherein the technique is of the type comprising attenuating molten glass from a rotating glass fiber forming spinner wherein the spinner comprises a first portion having a foraminous sidewall and an integral inwardly extending second portion. The improvement resides in the first portion being formed of a molten glass resistant oxide dispersion strengthened metal and a second portion being formed of a different alloy which is resistant to molten glass and wherein each of those portions are joined by transient liquid phase bonding.

As used herein the terms "transient liquid phase bonding alloy" and "brazing alloy" are used interchangeably. These terms comprehend a bonding alloy which contains one or more fugitive elements as melting point depressants. Because of the fugitive nature of these depressants by diffusion into the substrates which are being bonded, and even some volatilization losses, the concentration of these depressants in the residual bonding alloy, or metal, decreases during the heat treatment, or brazing cycle. This depletion in the residual alloy, in turn, progressively causes increases in the melting point of the residue during the heat treatment or brazing cycle. The result is a bonding interface (formed by transient liquid phase bonding) between the two substrates having a melting point greater than the melting point of the original transient liquid phase bonding alloy. This, of course, unlike standard brazing allows operation at a temperature above the initial melting point of the brazing alloy. Standard brazing and standard brazing alloys, in contrast to brazing as contemplated by this invention, do not employ fugitive melting point depressants which result in an alloy residue having an increased melting point. Standard brazing, therefore, would not allow one to operate at temperatures in excess of the initial melting point of the brazing alloy used.

DETAILED DESCRIPTION OF THE INVENTION INCLUDING THE BEST MODE OF CARRYING IT OUT

Figure 1:
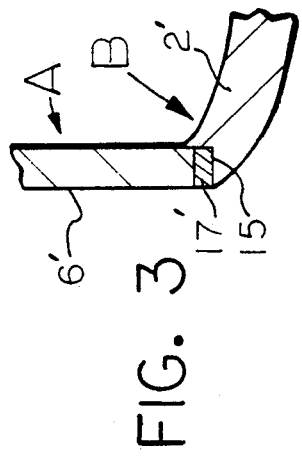
FIG. 1 is a perspective view of a spinner for forming glass fibers.

As indicated above the present invention contemplates forming a spinner and then utilizing that spinner, with rapid rotation, so as to attenuate and form molten glass fibers. The spinner is formed by, first of all, providing a first member, or portion, which has a sidewall and includes a circular, or annular, lower periphery.

This portion is formed from an oxide dispersion strengthened metal. A second member is provided which will serve as the bottom wall portion of the spinner. It has an outer circular periphery which nests, or is mateable with, the circular periphery of the first portion. The second portion is formed of a non-oxide dispersion strengthened alloy. The two members are joined at their periphery by transient liquid phase bonding, that is, by applying a transient liquid phase bonding alloy, or brazing material, to one of the members, preferably the periphery of the second member, joining the two portions and then heat treating the two portions and the brazing material to effect bonding. During this bonding the concentration of a fugitive melting point depressant in the brazing alloy is depleted and the melting point of the residual brazing alloy is progressively increased.

The first member can be formed with a plurality of fiber forming apertures either prior to the bonding step or after the bonding step. Additionally, the first member, which is formed of the oxide dispersion strengthened metal, will be subjected to a recrystallization heat treatment and this heat treatment can be done either before or after the bonding step. The transient liquid phase bonding alloy should have a heat treating range, or brazing temperature range, which is lower than the recrystallization temperature of the oxide dispersion strengthened metal.

The oxide dispersion strengthened metals intended ultimately for the formation of the component which will include the foraminous wall of the spinner may be any oxide dispersion strengthened metal which has adequate strength and resistance to molten glass. Oxide dispersion strengthened metals in general are well-known and are exemplified, for example, in U.S. Pat. Nos. 3,591,362, 3,738,817 and 3,814,635. The metal matrix in which the oxide dispersoid is present may be of any of a wide variety of compositions including nickel, cobalt, chromium and iron based materials. The refractory oxide dispersoid may be of a wide variety of oxides but yttria is highly preferred. The preferred metal matrices are nickel-chromium based alloys as well as nickel-chromium-cobalt based alloys. An especially suitable material is that available from Inco Alloys International as their designation MA-758. This is an alloy of nickel and chromium in a weight ratio of about 70:30 with yttria as a dispersoid in an amount of about 0.6% by weight. The alloy also contains small amounts of carbon, titanium, aluminum and iron. Representative of other oxide dispersion strengthened metals are those set forth in U.S. Pat. Nos. 4,877,435 and 4,402,767. Those skilled in the art will routinely select the most suitable oxide dispersion strengthened metal for any specific application depending on the glass composition with the objective, of course, being to select those having good high temperature strength and creep resistance as well as being oxidation resistant and corrosion resistant.

The non-oxide dispersion strengthened metal contemplated for use in forming the composite spinner are any of the alloys suitably employed in the manufacture of glass fiber forming spinners. These alloys include cobalt, nickel and iron based alloys frequently referred to as super alloys. Representative of suitable cobalt based alloys are those set forth in U.S. Pat. Nos. 3,933,484, 3,980,473 and 3,984,240. Other highly preferred compositions are those set forth in U.S. Pat. Nos. 4,668,265, 4,668,266, 4,761,169, 4,765,817, 4,767,432 and 4,820,324. Especially suitable are the cobalt based alloys set forth in U.S. Pat. No. 4,761,169 which alloys include chromium, nickel, tungsten, tantalum, zirconium, silicon, carbon, boron and hafnium and which composition may also typically include as impurity elements, aluminum, titanium, manganese, molybdenum and iron. A representative desirable alloy is a cobalt based alloy containing, in percent by weight, chromium in an amount of about 34.0 to about 38.0, nickel in an amount of about 10.0 to about 15.0, tungsten in an amount of about 4.0 to about 7.0, tantalum in an amount of about 2.0 to about 5.0, zirconium in an amount of about 0.1 to about 0.4, silicon will be present but about 0.15 max., carbon in an amount of 0.65 to about 0.95, boron in an amount of about 0.005 to about 0.02, hafnium in an amount of about 0.4 to about 1.0, aluminum 0.0 to about 0.2, titanium 0.0 to about 0.2, manganese 0.0 to about 0.05, molybdenum 0.0 to about 0.1 and iron 0.0 to about 2.0.

The brazing or transient liquid phase bonding alloy will be routinely selected by those skilled in the art from numerous commercially available formulations. Such alloys are available from Wall Colmonoy Corporation under their trade designation Nicrobraz brazing alloys. They are also available from Sulzer Plasma Technik, Inc. under their trade designation Amdry brazing metals. Alloy Metals Co. also supplies such materials. These alloys or metals preferably contain in excess of about 85% and, more desirably, an excess of 90% by weight of nickel and/or chromium. That is, they are preferably nickel based metals. They also typically include chromium and up to as much as 10% of boron, silicon and/or iron. The boron and silicon function as fugitive melting point depressants. During the heat treating cycle, the fugitive nature of these materials, either through diffusion into the substrates being bonded and/or through volatilization, cause their concentration in the residual alloy to be depleted with a consequent increase in the melting point of the interface composition during the bonding heating cycle. This is highly desirable since it produces an interface having a composition with a melting point that is higher than the original brazing material and therefore allows for a higher operating temperature. Unlike welding, cracking is not a major problem with this technique. These materials can be employed in paste form but more desirably they are employed as a tape or a foil. Foils generally are more preferred because of the higher density of the material. The tapes include the alloys carried on a pyrolizable backing tape. Two particularly preferred brazing metals are the Nicrobraz-150 and Amdry-775 materials. As alluded to above, the use of these brazing alloys overcomes the problem of weld cracking of oxide dispersion strengthened metals.

The brazing temperature ranges of the transient liquid phase bonding alloys should be below the recrystallization temperature of the oxide dispersion strengthened metal. Recrystallization heat treatments can be effected at temperatures of about 2400° F. to about 2450° F. for 1-2 hours. They likewise should obviously be below the melting point of the non-oxide dispersion strengthened metal component. The brazing alloys are heat treated in the known manner in a vacuum furnace. Typical absolute pressures in such vacuum furnaces for the brazing cycle range from about 0.001 to about 0.01 Pa. Typical heat treating temperatures are about 2000° F. to about 2100° F.

In the drawings, in FIG. 1, there is shown a spinner 1. Spinner 1 includes a bottom inwardly extending inclined flange portion 2 and a more level central flange portion 8 to provide an opening 3 in the bottom wall. Continuous peripheral sidewall 6 extends between, and is integral with, the bottom flange 2 and a top flange 4 to form a substantially cylindrical chamber. Sidewall 6 is a foraminous member provided with a plurality of apertures 7 through which molten glass is attenuated into fine fibers.

Figure 2:
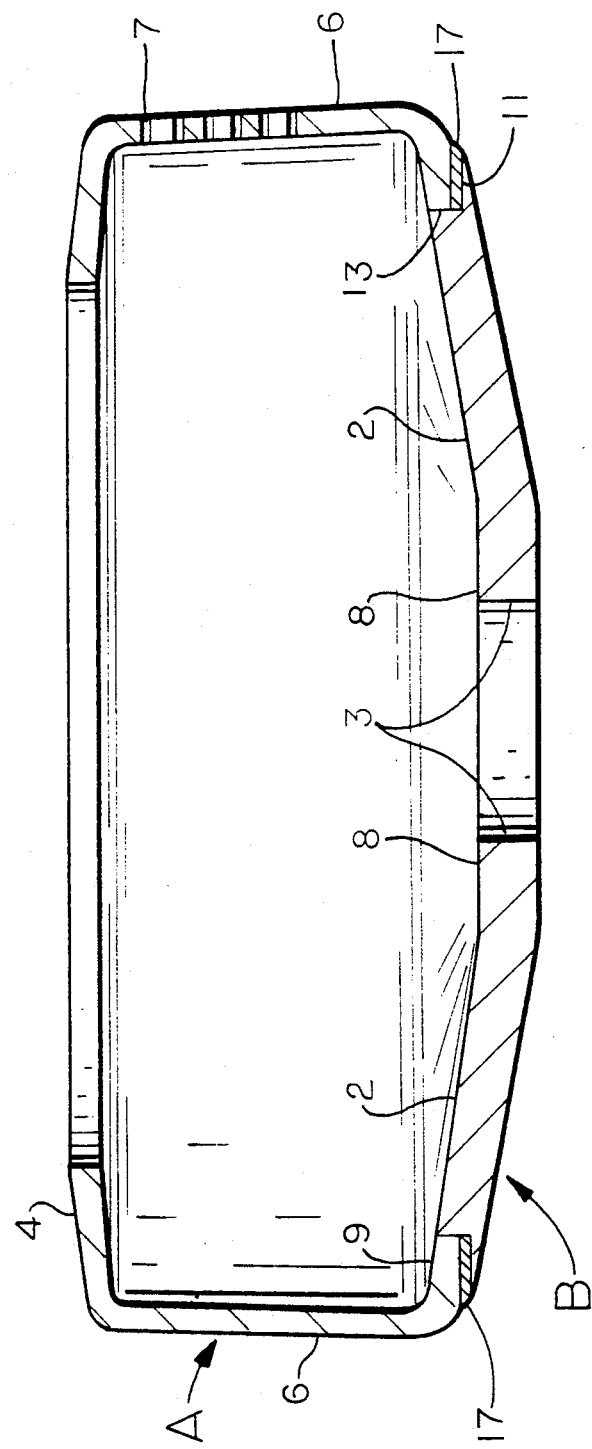
FIG. 2 is a sectional view showing one configuration for bonding the components to form a composite spinner in accordance with this invention.

Referring to FIG. 2 there is shown a first annular portion A which includes the sidewall 6, upper flange 4 and a lower inwardly extending protuberance 9. The left side of FIG. 2 in section shows first portion A prior to the formation of any fiber forming apertures 7. The right side of FIG. 2 shows sidewall 6 with such fiber forming apertures 7. First portion A is made of oxide dispersion strengthened metal and will be subjected to a recrystallization heat treatment either before or after being bonded to the second or bottom portion B. This heat treatment will provide the sidewalls with a coarse elongate grain structure. Second portion or member B is an annular member and as indicated includes an inclined flange portion 2 and more centrally located relatively flat flange portion 8. Inwardly extending protuberance 9 of first member A and the outwardly disposed annular end of second portion B will be machined so as to generally provide mating surfaces which will be joined at the brazing joint. That is, as seen in FIG. 2, second portion B will include an annular ledge 11 and an annular upwardly extending surface 13 which form a cutout into which protuberance 9 will seat. Both portions A and B will be transient liquid phase bonded to brazing joint 17.

Figure 3:
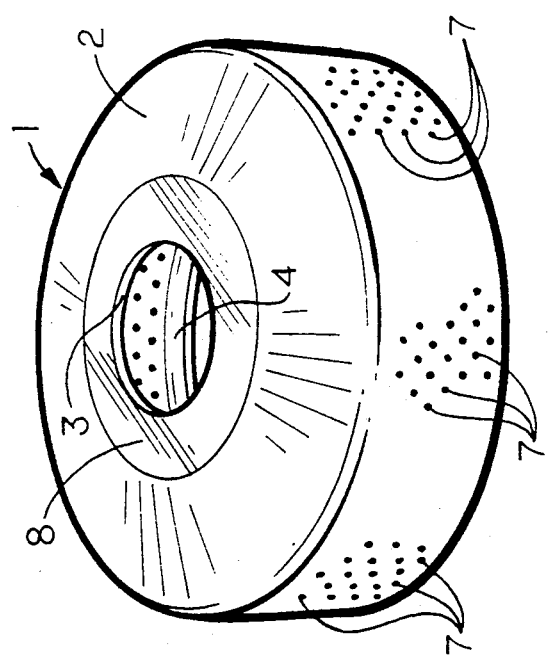
FIG. 3 shows an alternate configuration for bonding the members to form a composite spinner.

FIG. 3 shows an alternate configuration in which the sidewall 6' of first portion A seats and is bonded to brazing joint 17' which joint is also bonded to annular cutout portion 15 of flange 2' of second portion B. It will be observed that first portion A in FIG. 3 does not contain any inwardly extending protuberance 9 but simply a vertical wall 6'.

The transient liquid phase bonding alloy in either the form of a paste, tape or braze is positioned at the interface of first portion A and second portion B i.e. in the cutout portion to ultimately provide the brazed joint. The two components and the alloy are then subjected to a heat treatment to braze and thereby effect the formation of a tenacious bond between portions A and B. If the oxide dispersion strengthened metal portion A had not been subjected to the recrystallization heat treatment prior to brazing it will now be subject to the recrystallization heat treatment and if the apertures 7 were not formed into the sidewall 6 prior to brazing, these apertures will likewise now be formed in the sidewall. Any conventional technique may be employed to drill the holes to provide the fiber forming apertures. The drilling can include such techniques as laser drilling, electron beam drilling, electrical discharge machining and twist drilling.

Second portion B which is formed of a non-oxide dispersion strengthened alloy can be formed by any conventional technique including, for example, air casting as well as vacuum investment casting or forging. Oxide dispersion strengthened second portion A can be formed by spin forming in accordance with U.S. Pat. No. 4,402,767 but it is much more desirable to form that portion of the spinner by ring rolling techniques. A suitable ring rolling technique is disclosed in copending application U.S. Ser. No. 07/617,240 which is hereby incorporated by reference.

EXAMPLE

Using ring rolling techniques first portion A of FIG. 2 was formed from a yttria strengthened nickel-chromium alloy in which the weight ratio of nickel to chromium was approximately 70:30 and the yttria was about 0.6% by weight (MA-758 available from Inco Alloys International). First portion A had a diameter of about 40 inches and the upper flange 4 had a length of about 1.5 inches. Inwardly extending protuberance 9 had a length of about 0.75 inch. This material had been subjected to a recrystallization heat treatment and contained axially and circumferentially elongate coarse grain structure. U.S. Ser. No. 07/617,240 discloses suitable ring rolling techniques. Sidewall 6 had a thickness of about 0.2 inch.

Bottom portion B was formed by investment casting. The alloy had a composition of approximately (in weight percent) about 35.5% chromium, about 11% nickel, about 5.8% tungsten, about 2.5% tantalum, about 0.2% zirconium, about 0.1% silicon, about 0.74% carbon, about 0.01% boron and about 0.7% hafnium with the balance cobalt and incidental impurity levels of aluminum, titanium, manganese, molybdenum and iron. The outer annular part of second portion B was machined so that ledge 11 had a thickness of about 0.2 inch and the upstanding wall 13 had a height of about 0.2 inch. Typically a ledge length of approximately 0.2 to about 0.5 inch to effect brazing will be quite satisfactory.

After second portion B was formed, a brazing alloy of Ni-15Cr-3.5B (tape form from Sulzer Plasma Technik, Inc.) was positioned along ledge 11 and then the first portion A was placed on the alloy. This composite precursor was then placed upside-down in a furnace. A dead load of about 320 pounds, or 5 psi, was set atop this precursor to facilitate bonding. In a vacuum furnace (operating at a pressure of about 0.005 Pa) the mated parts were heated to a temperature of 2075° F. at a rate of 18° F. per minute. Upon reaching this temperature these parts were held for 4 hours and then cooled to room temperature at a rate of 18° F. per minute or less. A tenacious transient liquid phase joint 17 resulted and cracking was not a problem.

The composite spinner as produced above was then provided with a plurality of apertures 7 and tested. Excellent life and high quality fibers were observed. The deformation of this spinner was much less than that observed for standard spinners operating for the same length of time, for example spinners made entirely of the alloy (non-dispersion strengthened) described in the Example. The braze joint maintained its integrity during spinner operation.

While the above describes the present invention in sufficient particularity to enable those skilled in the art to make and use same it will of course be apparent that modifications are possible which pursuant to the patent statutes and laws do not depart from the spirit and scope of this invention.

I claim:

1. In a method of manufacturing glass fibers comprising attenuating molten glass through a rotating, glass fiber forming spinner, wherein said spinner comprises a first portion having a foraminous sidewall and an integral inwardly extending second portion, the improvement wherein said first portion is formed of a molten glass resistant, oxide dispersion strengthened alloy and said second portion is formed of a different alloy having resistance to molten glass and wherein said portions are transient liquid phase bonded to each other.

2. The method of claim 1 wherein said second portion is formed of a non-oxide dispersion strengthened alloy.

3. The method of claim 2 wherein said oxide dispersion strengthened alloy is a yttria strengthened nickel-chromium or nickel-chromium-cobalt alloy and wherein said non-oxide dispersion strengthened alloy is a cobalt or nickel based alloy and wherein the material used for said transient liquid phase bonding is a nickel based alloy.

4. A method for forming a glass fiber forming composite spinner comprising providing a first member having a circular periphery, said first portion being formed of a glass resistant oxide dispersion strengthened alloy; providing a second member having a circular peripheral portion, said second member being formed of a non-oxide dispersion strengthened glass resistant alloy; applying a transient liquid phase bonding alloy to either or both of the circular peripheries of said first and second portions; bringing said first and second portions and said alloy into contact and transient liquid phase bonding said first and second portions to each other, and wherein said material used for the transient liquid phase bonding has a brazing temperature less than the recrystallization temperature of said oxide dispersion strengthened metal and less than the melting point of said non-oxide dispersion strengthened alloy, and wherein said oxide dispersion strengthened alloy is subjected to a recrystallization heat treatment either before or after said bonding and wherein said first member is provided with a plurality of fiber forming apertures either before or after said bonding.

5. The method of claim 4 wherein the alloy used for transient liquid phase bonding is a nickel based material.

6. The method of claim 5 wherein said oxide dispersion strengthened alloy is a yttria stabilized nickel-chromium or nickel-chromium-cobalt alloy.

7. The method of claim 6 wherein said non-oxide dispersion strengthened alloy is a cobalt or nickel based alloy.

* * * * *